Feb. 1, 1927.
D. CAGLE
1,616,349
BABY HOLDER
Filed July 14, 1924   3 Sheets-Sheet 1
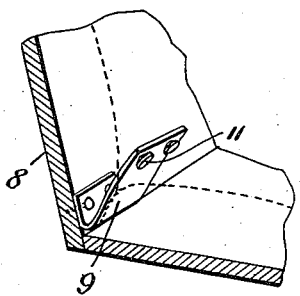
Dora Cagle
INVENTOR
BY Victor J. Evans
ATTORNEY
WITNESS: Gerald Hennessy

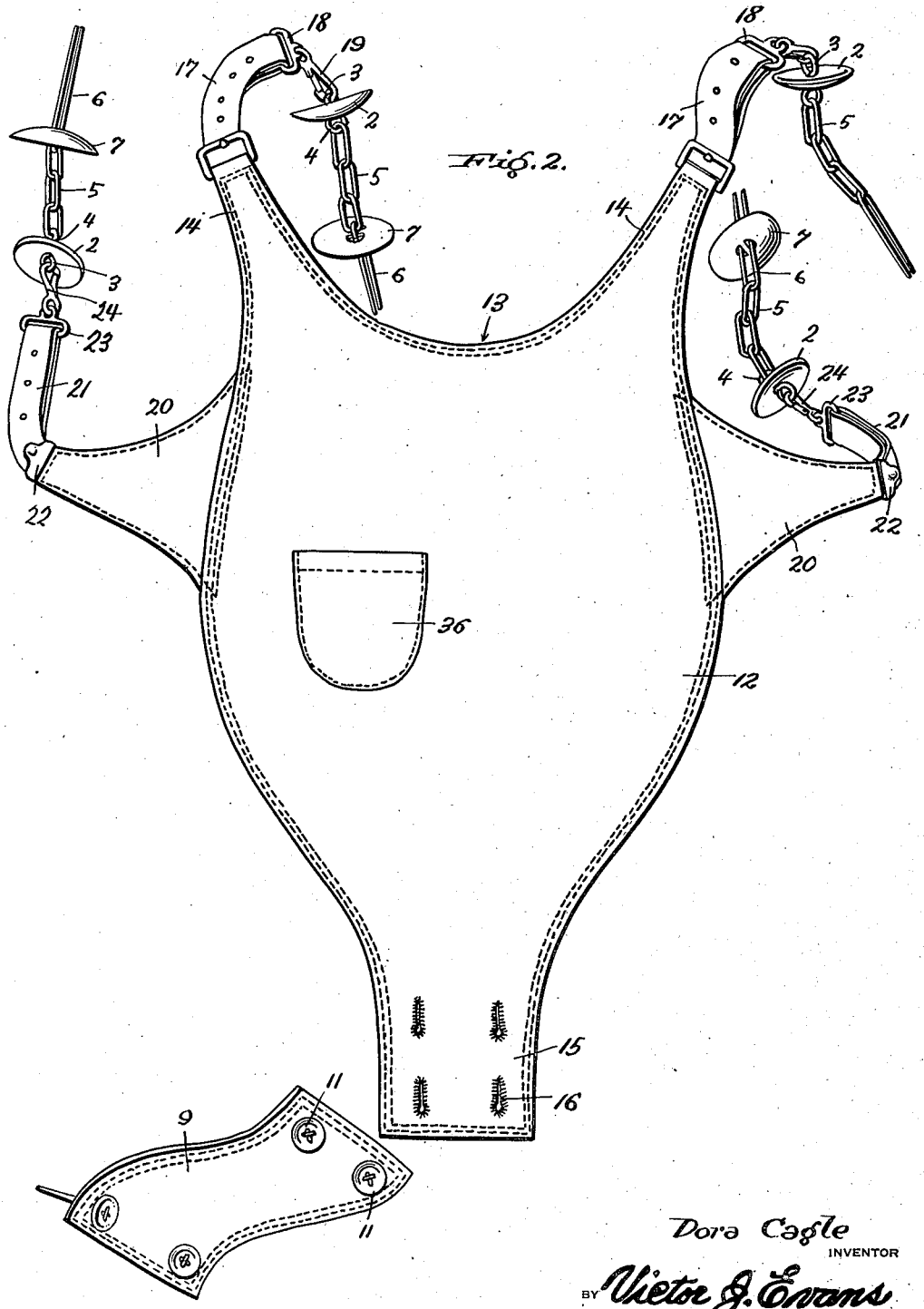

Feb. 1, 1927.
D. CAGLE
BABY HOLDER
Filed July 14, 1924    3 Sheets-Sheet 3
1,616,349
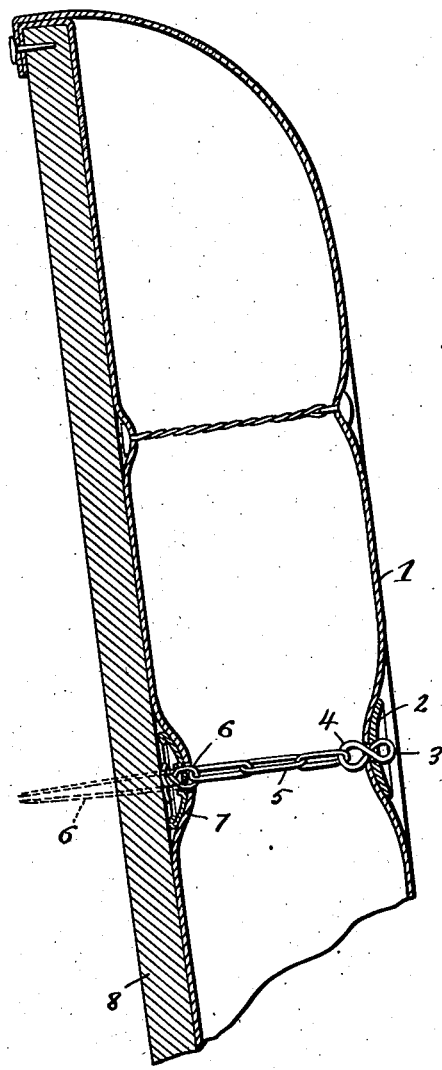
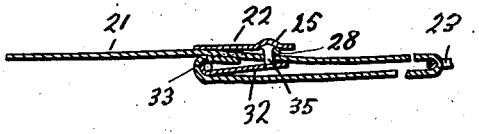
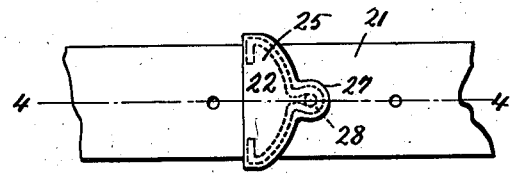
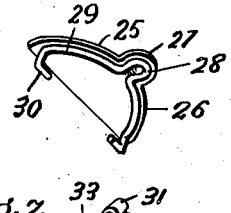
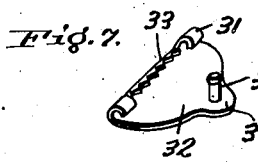
Dora Cagle,
INVENTOR
BY Victor J. Evans
ATTORNEY
WITNESS:

Patented Feb. 1, 1927.

1,616,349

UNITED STATES PATENT OFFICE.

DORA CAGLE, OF RINGLING, OKLAHOMA.

BABY HOLDER.

Application filed July 14, 1924. Serial No. 726,034.

My present invention has reference to a simple, cheap and effective means for supporting an infant in a comfortable upright position on the seat of an automobile or the like.

My object is the provision of a baby holder for this purpose that can be removably and adjustably attached to the back of a seat of an automobile and which is of such construction as to firmly brace the chest and encircle the arms as well as being received beneath the crotch of an infant for effectively and comfortably supporting the infant in a seated position in the automobile.

With the above broadly stated objects in view and others which will appear as the nature of the invention is better understood, reference is to be had to the drawings which accompany and which form part of this application.

In the drawings:—

Figure 1 is a perspective view illustrating the application of the improvement.

Figure 2 is a plan view on an enlarged scale of the improvement.

Figure 3 is a sectional view taken through the back of an automobile seat to show the manner in which the eye carrying buttons are secured on the cushion of the seat.

Figure 4 is a sectional view on the line 4—4 of Figure 5.

Figure 5 is a plan view of one of the adjustable straps showing the manner in which the ends thereof are connected.

Figure 6 is a perspective view of one of the elements constituting the buckle for the strap.

Figure 7 is a similar view of the second element of the buckle.

Figure 8 is a fragmentary perspective view showing the manner in which the strap for the crotch tab is connected to the rear board of the seat so that the same may be extended between the cushion of the seat and the back cushion therefor.

As disclosed most clearly in Figure 3 of the drawings, I preferably remove the buttons which are connected by the cords to the face and to the back cushion 1 of an automobile. In lieu of these buttons I employ buttons whose outer faces are concaved. These buttons are indicated by the numeral 2, and through the said buttons there is passed a substantially 8-shaped wire providing an outer eye 3 and an inner eye 4. To the inner eye there is connected any desired number of links 5, and through the outer link there is passed a substantially U-shaped wire member 6. The wire member passes through the rear facing of the cushion 1 and also through spaced eyes on a button 7 substantially similar to the button 2. The arms of the U-shaped wire member are twisted upon themselves to knot the same, as disclosed in the said Figure 3. Four of the buttons 2 carrying the eyes 3 are arranged upon the back cushion 1, the same being disposed in upper and lower pairs, both in the same longitudinal line.

As disclosed in Figure 8 of the drawings, I tack or otherwise secure to the wooden support 8 for the cushion 1 a fabric strip 9. The strip is designed to be passed between the back cushion 1 and the seat cushion 10 of the automobile, and the projecting end thereof has sewed thereon a pair of buttons 11.

The holder proper comprises a body of some suitable soft fabric and is broadly indicated by the numeral 12. The body has its front, at its upper edge, inwardly rounded, as at 13, to provide a concavity for the neck of the infant, and likewise to provide at the upper and outer corners of the said body tabs 14—14. The outer edges of the tabs are rounded toward the body, and the center of the body has its edges rounded outwardly and from thence inwardly to the bottom thereof, providing the said bottom with a central reduced tab 15. The tab is formed with any desired number of pairs of buttonholes 16 designed for engagement with the buttons 11 on the strip 9.

Adjustably connected by means of buckles to the ends of the tabs 14 there are folded straps 17. These straps carry eye members 18 provided with snap hooks 19 to engage with the eyes 3 on the upper pair of buttons 2.

On the edges of the body 12, below the shoulder straps 14 there may be formed, but preferably I stitch, tabs 20. The tabs 20 have reduced ends to which are attached straps 21 through the medium of buckles 22. The straps 21 also carry eyes 23 provided with snap hooks 24 to engage the eyes 3 in the lower pair of buttons 2.

In order that the buckles 14 and 22 will inflict no injury to the person of the infant supported by the improvement, I preferably form the said buckles of a peculiar construction, as illustrated most clearly in Figures 6 and 7 of the drawings. The outer member of each of the buckles is indicated by the numeral 25 and is, of course, of metal. The member 25 is segmental in plan but has a central outwardly rounded extension on its curved edge. The rounded edge of the member 25 as well as its said extension are flanged, as at 26. For distinction, the rounded extension is indicated by the numeral 27, and received therein is an eye 28 formed by centrally bending a wire member. The arms of the wire member are arched, as at 29, to contact with the side flanges 26, and the ends of the said arms are directed toward each other, as at 30. The ends 30 are designed to be received in the eyes 31 formed on the ends of the second segmental member 32 of the buckle. The eyes are formed on the straight end of the member 32, and between the said eyes there are upstanding teeth 33. The member 32 has its rounded edge centrally formed with a rounded extension 34 and secured thereto there is a knob or headed pin 35 designed to be received in the eye 28 provided by the spring rod. The eye or stud 34 is designed to pass through any one of a series of openings in the respective straps 17 and 21.

The body of the protector may be and preferably is provided on its outer face with a pocket 36. The protector may be readily attached to the back cushion of an automobile, and adjusted so as to comfortably support the child on the seat and against the back cushion of said seat. The improvement may be cheaply manufactured and may be readily installed upon the seat cushion of any automobile or like vehicle. The device, as stated, may be adjusted to accommodate different sizes of infants, and as the same is constructed of fabric, it may be readily cleaned.

Having described the invention, I claim:—

In combination with a fabric body comprising a baby holder, which is provided with tabs having hooks on the outer ends thereof, of attaching means for such holder comprising each a button having a concave outer face, an S-shaped connecting member carried by said button with its outer eye disclosed in the concave portion of the button and its other eye arranged upon the convex portion of the button, links connected with the last mentioned eye, a substantially U-shaped bendable wire member on the outermost link, and a button member having spaced eyes through which the arms of the U-shaped member pass.

In testimony whereof I affix my signature.

DORA CAGLE.